Dec. 19, 1950 R. J. McKINNON 2,534,826
VACUUM STEAM HEATING SYSTEM AND
METHOD OF OPERATING THE SAME
Filed Dec. 31, 1946 2 Sheets-Sheet 2
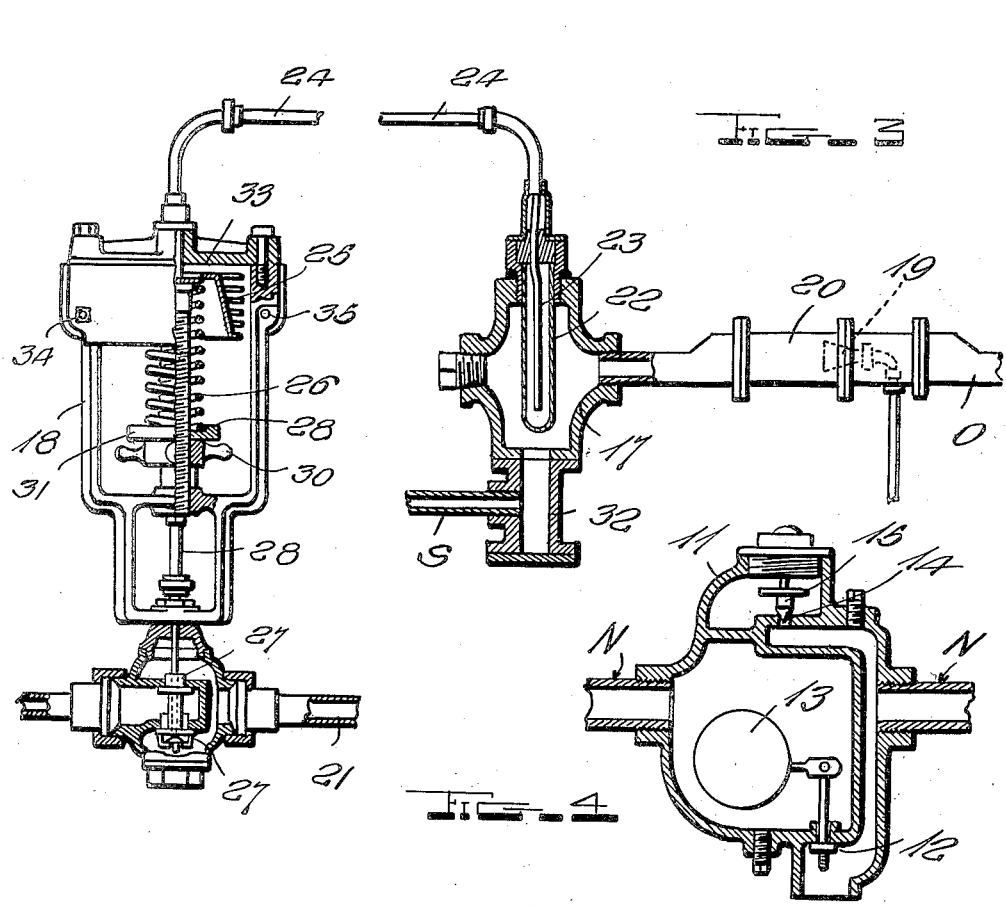
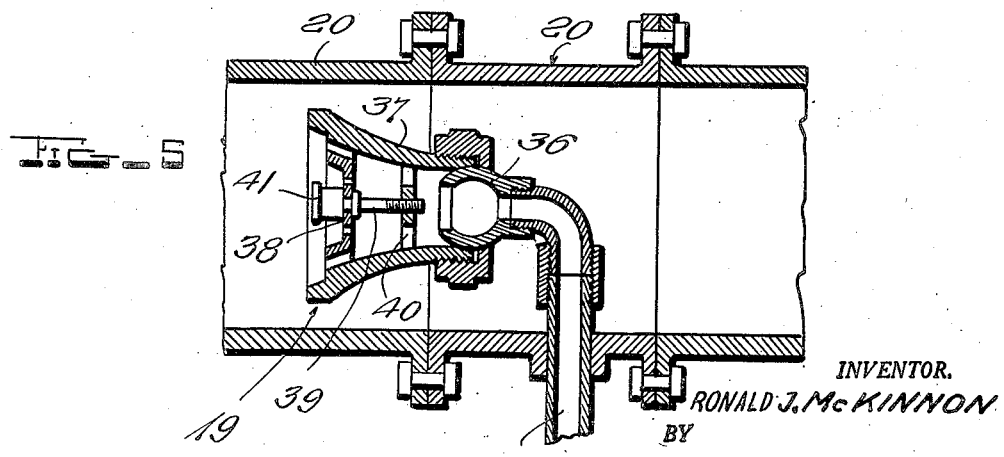
INVENTOR.
RONALD J. McKINNON
BY
Shreve, Crowe & Gordon
ATTORNEYS Patented Dec. 19, 1950

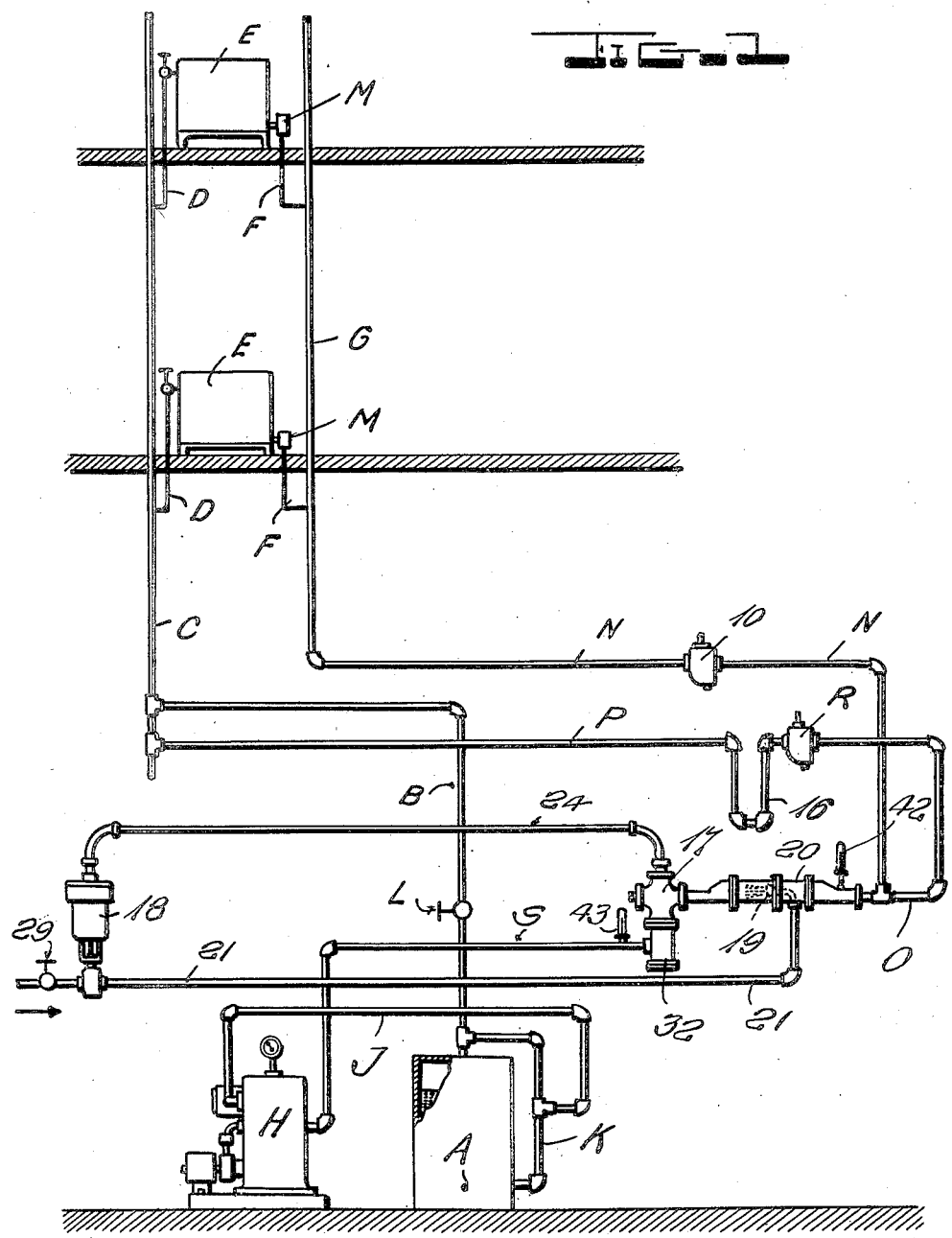

2,534,826

UNITED STATES PATENT OFFICE 2,534,826

VACUUM STEAM HEATING SYSTEM AND METHOD OF OPERATING THE SAME

Ronald J. McKinnon, Bedford Hills, N. Y.

Application December 31, 1946, Serial No. 719,436

7 Claims. (Cl. 237—9)

The present invention relates to certain improvements in steam heating systems for homes and buildings wherein the condensate return system is operated under vacuum, the invention relating to a type of steam heating systems known as a return line vacuum heating system that is designed to operate at two pounds steam pressure on the supply mains with a vacuum on the return mains of from three to seven inches.

In the operation of heating systems of this type, difficulty is experienced in maintaining proper temperature and pressure differentials in the supply and return systems, in the absence of which proper differentials, produces inefficient operation of the heating system or complete cessation of such operation.

The present invention has for its principal object the provision of instrumentalities which will be operative automatically to maintain such proper temperature and pressure differentials between the supply mains and the steam leads so as to assure a continuous and efficient operation of the system.

Other objects and advantages of the invention will become apparent as the description proceeds, and the features of novelty will be pointed out in particularity in the appended claims.

Generally speaking the objects of the present invention are attained by the provision of temperature-controlled instrumentalities in the condensate return system of the heating installation, together with temperature-controlling mechanism operable responsively to actuation of the temperature controlled instrumentalities for maintaining the temperature in the condensate return system substantially constant. This is accomplished by the provision in the return line of thermostatically operated traps for the condensate and water spray instrumentalities controlled by temperature-responsive mechanisms for injecting intermittently a spray of cold water into the returning condensate for maintaining the temperature thereof substantially constant for assuring proper operation of the vacuum pump by maintenance of proper pressure and temperature differentials in the system.

Therefore, these sequences become a very simple procedure for an operating engineer to observe whether the system is functioning normally, by the usual visual observation of the boiler water line which ordinarily is operated at or about the second gauge level. Any change above this second gauge level will alert the operator who would proceed to remove any excess by one or the other of two usual methods, that is, either by blowing down the boiler direct to the sewer, or to use the valve drain connection at the pump direct to the sewer.

With these and other objects in view, which will become apparent as the description proceeds, the invention resides in the construction, combination, and arrangement of parts, hereinafter more fully described and claimed and illustrated in the accompanying drawings, in which like characters of reference indicate like parts throughout the several figures of which:

Fig. 1 is a diagrammatic layout of a vacuum steam heating system embodying the improvements of the present invention.

Fig. 2 is a sectional elevation on an enlarged scale through a control valve for intermittently introducing cold water into the system for maintaining the temperature substantially constant in the return system.

Fig. 3 is a sectional elevation on an enlarged scale of a temperature responsive element for actuating the valve of Fig. 2.

Fig. 4 is a sectional elevation through one of the thermostatic traps employed in the system of the present invention.

Fig. 5 is a sectional elevation of the spray nozzle employed in the carrying out of the present invention.

Referring more particularly to the drawings, the reference character A represents a boiler for the production of steam, which is carried by steam pipe B into the steam riser C, connections D from which lead to radiators E. Condensate from the radiators is drawn through connections F into the return risers G through action of vacuum pump H. The vacuum pump H discharges to the boiler A through pipe J, this pipe connecting into the boiler steam equalizer K. The reference character L represents the main steam control valve positioned in the main steam pipe B.

The radiators E are shown provided with vacuum traps M in communication with connections F, and the return riser G connects with the return riser drip piping N, which in turn is connected to main vacuum return piping O. A steam main drip piping P also connects the main vacuum return piping O with the steam riser C. A steam main drip trap R is inserted in the steam main piping P to the main return piping O and the vacuum pump H is connected to said main vacuum return piping O through the suction piping S.

The above represents a conventional vacuum-operated heating system in which has been incorporated the features of the present invention for the continuous maintenance of smooth and efficient operation of the system.

These features of the present invention include a float and thermostatic trap 10 introduced into the return riser drip piping N, which trap 10 is similar in construction to the trap R, and is illustrated in Fig. 4. This trap comprises a housing 11, a valve 12 therein being operated by a float 13, the valve 12 being located at the lowest point inside the trap body. Air is removed through a thermostatically controlled valve port 14 controlled by a thermostatic valve 15. The trap is continuous in discharge and quickly removes condensation and air from the return riser drip piping N. The construction of the trap permits a deep water seal on the discharge valve 12, air being removed through the thermostatically controlled port in the cap of the trap, and normally discharged through said port directly to the outlet connection of the trap. This trap is of standard construction and has been found to be well adapted for this purpose, although the invention is not limited to such particular equipment.

The invention further comprises the incorporation of a water seal which is maintained in the loop piping 16 inserted in the steam main drip piping P in advance of the trap R. This water seal functions as an equalizer in preventing the short circuiting of the steam into the return main O before it goes to and through the radiators. This short circuiting may occur in the absence of the water seal from either of two causes, both having the same effect, that is, such short circuiting may be caused by a defective drip trap which passes steam directly through the trap, or it may be caused by an overefficient trap that functions as though continuously open and passes steam directly through the trap. The provision of the water seal 16 therefore is an important safety factor in the smooth operation of the system.

In addition to the foregoing features, the present invention includes the provision of temperature-responsive control instrumentalities for lowering the temperature of the vacuum condensate to a constant value, in order to assure the proper temperature gradient for maintaining efficient operation of vacuum pump H. Such temperature responsive instrumentalities comprise a thermostatic unit 17, a control valve unit 18 operable responsively to actuation of said unit 17, and a spray nozzle unit 19 located in the special spray chamber construction 20 in the return main O, said spray unit 19 being operated intermittently responsively to opening of the control valve unit 18 to admit cold water to the nozzle through pipe 21, whenever the temperature of the return condensate exceeds a predetermined temperature at which the thermostatic unit 17 is set to operate. The thermostatic unit 17 and cooperative control valve 18 are of standard construction.

As will be seen from the drawings the thermostatic unit 17 is located between the spray chamber 20 and the vacuum pump H in the return main O and when the temperature of the returning condensate exceeds a predetermined value, the resulting expansion of thermostatic fluid (e. g. air) contained in the housing 22 transmits pressure through tubes 23 and 24 to the bellows 25 of the valve 18 operating said bellows against the pressure of coil spring 26 to open the control valve element 27 of unit 18, thus admitting cold water to the spray nozzle 19 through the pipe 21, the bellows 25 being connected to the valve stem 28, said valve stem in turn carrying the valve element 27. A manually operable valve 29 preferably is provided for controlling admission of water from the main source of supply to the control valve. An adjustable nut 30 is threadedly mounted on the valve stem 28, this nut bearing against a collar 31 which forms an abutment for the spring 26. The pressure exerted by the spring 26 against the bellows 25 is adjustable by the adjustment of the nut 30 and the collar 31 against the spring 26, this pressure determining the temperature at which the valve element 27 will open.

Thus, the spray nozzle 19 functions only when the thermostatic unit 17 opens or actuates the control valve 18, which opens the supply pipe 21. Spray from the nozzle 19 operates to reduce the temperature of the returning condensate to efficient limits by reducing the temperature in the return piping O. As the average heating system return pump temperatures usually are about 180 degrees to 200 degrees, and if, for instance, the valve 18 has been set to open at 140 degrees, when the temperature of 140 degrees has been reached the thermostatic unit 18 acts on the control valve 27 to open it, so that cold water will flow to the spray nozzle 19 and mix with the high temperature condensate before the latter returns to the pump H, thereby automatically decreasing the temperature of the condensate before it reaches the pump, thereby keeping the vacuum pump H at the low required temperature and high operating vacuum. The condensate and added water collect in the well 32 of the thermostatic unit 17 and the resulting mixture returns to the pump H by way of pipe S which connects the well 32 and said pump.

The above temperature values are to be understood as illustrative only. For access to the adjusting nut 30, the housing of the control valve assembly 18 is provided with a hinged cover 33, that normally is locked at 34, but which is pivoted as indicated at 35.

The spray nozzle 19 is illustrated in detail in Fig. 5, and is of standard construction. Pipe 21 opens into a connection 36 that receives the nozzle housing 37, that is mounted as shown on connection 36. Housing 37 contains a multiple-orificed spray disc 38, which may rotate on spindle 39 under pressure of water admitted through pipe 21. However, as the spindle 39 is threaded in a spider 40 mounted in the housing 37, tightening of the spindle by manual operation of head 41 thereof prevents rotation of the disc 38, which in the present instance is preferable.

From the foregoing, it will be apparent that while the invention is designed to utilize standard parts, it is predicated upon the concept of maintaining predeterminedly controlled conditions in the return condensate system of a vacuum steam heating apparatus. In order to check further the proper operation of the improved system of the invention, thermometers 42 and 43 may be installed in the condensate return main in advance of the spray chamber 20 and behind the thermostatic element 17, respectively, to indicate visually the temperature of the condensate entering the spray chamber 20 and the temperature of the condensate leaving the well 32, thereby visually indicating the proper operation of the temperature responsive mechanism.

In accordance with the present invention, it is unnecessary to carry in the system what is called "atmospheric steam pressure" which is pressure above atmosphere and may be as much as five pounds above atmosphere. The heating system is operated in accordance with the present invention by vacuum steam pressure, which is accomplished by adjusting the main steam valve L so as to keep a positive steam pressure on the boiler only, the heating system being operated by vacuum steam pressure. This is accomplished as described herein by keeping the vacuum pump H operating at a high vacuum, and the adjustment of the main steam valve L to this high vacuum results in an overall vacuum steam control system, operating in a vacuum steam range of between two and ten inches vacuum instead of a steam pressure above atmosphere on the steam main piping system, as is the customary procedure.

While for sake of brevity only one column of radiators is shown, it is to be understood that additional columns and the number of radiators may be increased as desired without departing from the scope of the invention.

From the above it will be apparent that I have designed a heating system adapted to operate in a manner to effect a material saving in operating costs and conservation of fuel, yet simple in construction, comprising few operative parts, easily installable, manufacturable at a reasonable cost and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is desired to emphasize that various minor changes in details of construction, proportion and arrangement of parts, may be resorted to within the scope of the appended claims without departing from or sacrificing any of the principles of this invention.

Having thus described the invention, what I desire protected by Letters Patent is as set forth in the following claims:

1. In a vacuum steam heating system including a boiler, a vacuum pump, means for supplying condensed water from the vacuum pump to the boiler, a main steam line from the boiler, a steam riser connected to the main steam line, radiators connected to the riser, a condensate return riser connected to the radiators, a condensate return main connected to the condensate return riser and to the vacuum pump, return drip piping connecting the condensate return riser and the condensate return main, and steam main drip piping connected to the steam riser below the main steam line and to the condensate return main, the improvements which consist of a thermostatic trap and air vent in each of the return drip piping and in the steam main drip piping, a water seal in the steam main drip piping intermediate the steam riser and the thermostatic trap and air vent for preventing short circuiting of steam from the main steam line to the condensate return main before the steam passes through the radiators, and instrumentalities in the condensate return main in advance of the vacuum pump for maintaining substantially constant the temperature of the returning condensate, thereby maintaining a substantially constant vacuum through the condensate return riser and mains.

2. In a vacuum steam heating system including a boiler, a vacuum pump, means for supplying condensed water from the vacuum pump to the boiler, a main steam line from the boiler, a steam riser connected to the main steam line, radiators connected to the riser, a condensate return riser connected to the radiators, a condensate return main connected to the condensate return riser and to the vacuum pump, return drip piping connecting the condensate return riser and the condensate return main, and steam main drip piping connected to the steam riser below the main steam line and to the condensate return main, the improvements which comprise a thermostatic trap and air vent in each of the return drip piping and in the steam return drip piping, a water seal in the steam main drip piping intermediate the steam riser and the thermostatic trap and air vent for preventing short circuiting of steam from the main steam line to the condensate return main before the steam passes through the radiators, and instrumentalities in the condensate return main in advance of the vacuum pump for maintaining substantially constant the temperature of returning condensate, thereby maintaining a substantially constant vacuum through the condensate return riser and mains, the said instrumentalities including temperature responsive mechanism in the condensate return line, a control valve actuated by the temperature responsive mechanism, a spray nozzle in the condensate return line, and a cold water line controlled by the said valve for supplying cold water to the nozzle at intervals determined by a predetermined rise in temperature of the returning condensate whereby the temperature responsive mechanism actuates to open the control valve for admitting cold water to the spray nozzle, the cold water injected into the returning condensate by the nozzle maintaining the temperature of the condensate at a substantially constant predetermined value.

3. The method of operating a vacuum steam heating system which comprises passing steam under a positive pressure from a boiler through a radiator wherein condensation of the steam is effected, drawing the resulting condensate under vacuum through a condensate return system, pumping the condensate back into the boiler, and predeterminedly cooling the condensate being drawn through the condensate return system to a substantially constant cooled temperature for maintaining a constant vacuum on the condensate return system.

4. The method of operating a vacuum steam heating system which comprises passing steam under a positive pressure from a boiler through a radiator wherein condensation of the steam is effected, drawing the resulting condensate under vacuum through a condensate return system, returning the condensate to the boiler and predeterminedly cooling the condensate being drawn through the condensate return system to a substantially constant cool temperature by injecting cold water into the condensate responsively to predetermined increase in temperature of the condensate until it returns to its predetermined cooled temperature, thereby maintaining a substantially constant vacuum on the condensate return system.

5. In a vacuum steam heating system including a steam generating boiler, a steam riser pipe system communicating with the boiler, steam radiators connected to the riser pipe for receiving steam from the riser pipe, a vacuum condensate return system connected to the radiators for returning condensate from the radiators to the boiler, a vacuum pump connected to the condensate return system for withdrawing condensate through the steam system and for maintaining the radiators under a vacuum, means connecting the condensate return system to the vacuum pump, means connecting the vacuum pump to the boiler, a drip piping connecting the steam pipe riser system to the vacuum condensate return system, means for supplying cool make-up water to the system including an intake pipe connected to the drip piping, and means including a spray chamber mounted in the condensate return system intermediate the vacuum pump and the connection for the drip piping to the condensate return system, a control valve mounted in the cool water supply means, the said cool water supply means being connected into the spray chamber, thermostatic control means intermediate the spray chamber and the vacuum pump, a connecting pipe connecting the thermostatic control means and the vacuum pump, the thermostatic control means being operable responsive to the condensate return exceeding a predetermined temperature for injecting water from the cool water supply means into the spray chamber for maintaining the condensate return at a constant temperature.

6. In a vacuum steam heating system comprising a steam generating boiler, a steam riser pipe system communicating with the boiler, steam radiators connected to the riser pipe system for receiving steam therefrom, a vacuum condensate return system connected to the radiators for returning condensate from the radiators to the boiler, a vacuum pump connected to the condensate return system for withdrawing condensate through the return system and for maintaining the radiators under a vacuum, means connecting the condensate return system to the vacuum pump, means connecting the vacuum pump to the boiler, a drip pipe connecting the steam riser pipe system to the vacuum condensate return system, a main drip trap mounted in the said drip pipe, means for supplying cool water to the system including an intake pipe connected to the drip piping and a control valve in the intake pipe, and means including a thermostatically controlled trap mounted in the vacuum condensate return system for removing condensate and air from the return system for the condensate, instrumentalities mounted in the drip pipe intermediate the main drip trap and the steam riser pipe system for equalizing vacuum pressure on both the steam riser system and the vacuum condensate steam system for preventing short circuiting of steam direct from the steam riser system to the condensate return system before passing through the radiators, and instrumentalities operatively responsive to a temperature in the condensate return system in excess of a predetermined value for operating the water control valve in the intake pipe for injecting cooling water in the condensate return system until the temperature thereof is lowered to the said predetermined value.

7. In a vacuum steam heating system comprising a steam generating boiler, a steam riser pipe system communicating with the boiler, steam radiators connected to the riser pipe system for receiving steam therefrom, a vacuum condensate return system connected to the radiators for returning condensate from the radiators to the boiler, a vacuum pump connected to the condensate return system for withdrawing condensate through the return system and for maintaining the radiators under a vacuum, means connecting the condensate return system to the vacuum pump, means connecting the vacuum pump to the boiler, a drip pipe connecting the steam pipe riser system to the vacuum condensate return system, a main drip trap mounted in the said drip pipe, means for supplying cool water to the system including an intake pipe connected to the drip piping and a control valve in the intake pipe, and means including mechanism operable under action of the vacuum pump for maintaining a constant amount of vacuum through the steam heating system and for maintaining constant and continuous operation of the system, the said mechanism including a U-shaped water seal positioned in the drip pipe intermediate the main drip trap and the steam riser pipe system for equalizing vacuum pressure on both the steam riser system and the vacuum condensate return system for preventing short circuiting of steam direct from the steam riser system to the condensate return system before passing through the radiators, instrumentalities operable responsive to a temperature in the condensate return system in excess of a predetermined value, means for operating the water control valve in the intake pipe responsive to actuation of the said temperature operable instrumentalities, whereby water is admitted from the intake pipe into the condensate return system, and means for injecting water from the intake pipe into the condensate return system until the temperature of the said system returns to its predetermined value.

RONALD J. McKINNON.

REFERENCES CITED

The following references are of record in the file of this patent:

UNITED STATES PATENTS

| Number | Name | Date |
|---|---|---|
| 1,418,835 | Schoonmaker | June 6, 1922 |
| 2,108,601 | Leutwiler et al. | Feb. 15, 1938 |
| 2,193,160 | Browne | Mar. 12, 1940 |
| 2,312,191 | Reader | Feb. 23, 1943 |
| 2,372,087 | Karassik | Mar. 20, 1945 |